United States Patent Office 2,861,049
Patented Nov. 18, 1958

2,861,049

SOLUTION OF POLYETHYLENE TEREPHTHALATE IN O-NITROBENZALDEHYDE AND PROCESS OF PREPARATION

Otto Fuchs, Frankfurt am Main, Germany, assignor to Farbwerke Hoechst Aktiengesellschaft vormals Meister Lucius & Brüning, Frankfurt am Main, Germany, a corporation of Germany No Drawing. Application February 19, 1954
Serial No. 411,575

Claims priority, application Germany February 27, 1953

2 Claims. (Cl. 260—32.4)

The present invention relates to compositions of matter.

Shaped structures, such as threads, foils and the like, composed of polyesters of terephthalic acid with aliphatic dihydroxy-compounds, for example, polyethylene glycol terephthalate, are usually formed from a fused mass of the polyester. Shaped structures can also be made from solutions of the polyesters. Phenols and nitrobenzene are known to be good solvents for such polyesters at a raised temperature, but these solvents are undesirable owing to their disadvantageous physiological properties.

Now I have found that ortho-nitrobenzaldehyde is well suited as a solvent for polyesters of terephthalic acid with aliphatic dihydroxy-compounds.

The ortho-nitrobenzaldehyde may be diluted with other substances, which by themselves do not dissolve the polyester or dissolve it only with difficulty. As such diluents there may be used more especially aromatic or partially hydrogenated aromatic compounds, which may be alkylated.

As diluents there may also be mentioned compounds such as naphthalene, diphenyl, tetrahydronaphthalene, decahydronaphthalene, xylene, methyl-naphthalene and mesitylene. The proportion of the diluent in the solvent-diluent mixture may be up to 50 percent.

The solutions so obtained are especially suitable for the manufacture of foils composed of the aforesaid polyesters. The foils are made in known manner, for example, by the use of a foil casting machine.

Compounds of the above kind which boil above 250° C. under normal pressure can be used as softeners for the polyesters.

The softener is incorporated in the polyester by kneading or rolling the mixture at a temperature at which the mixture is viscous. This temperature is at least 150° C. and may be as high as the melting point of the polyester.

The concentration of the polyester in the solvent or mixture of solvent and diluents may vary depending on the molecular weight of the polyester.

The following example serves to illustrate the invention but it is not intended to limit it thereto:

Solubility tests were carried out by dissolving 1 gram of polyethylene glycol terephthalate in 100 cc. of ortho-nitrobenzaldehyde and other solvents or solvent mixtures, and then determining the temperature at which the polyester separated out on cooling. This temperature is referred to as the "solubility temperature," and can serve only as a numerical value for comparing the different solvent powers of the various solvents or solvent mixtures. In order to prepare the solutions rapidly it is of advantage to use the solvent at a temperature which, depending on the concentration of the polyester, is about 20 to about 40 degrees centigrade above the solubility temperature, and which should at least be 120° C. The specific viscosity of the polyester used was 0.64 for a solution of 1 percent strength in phenol at 50° C. The results are given in the following table, in which the proportions of the solvents in solvent mixtures are by weight:

| Solvent: | Solubility temperature (° C.) |
|---|---|
| Acetophenone | 125 |
| Cyclohexenyl methyl ketone | 150 |
| Benzal-acetone (methyl styryl ketone) | 148 |
| Benzoyl-acetone | 140 |
| Methyl 1-naphthyl ketone | 105 |
| Methyl 2-naphthyl ketone | 115 |
| Tetrahydronaphthalene methyl ketone | 125 |
| Benzaldehyde | 100 |
| Salicylaldehyde | 100 |
| 2-methoxy-benzaldehyde | 120 |
| Ortho-nitrobenzaldehyde | 50 |
| 1-naphthaldehyde | 100 |
| Pyridine aldehyde | 80 |
| Benzaldehyde+mesitylene 1:1 | 130 |
| 1-naphthaldehyde+tetrahydronaphthalene 1:1 | 160 |
| 3-hydroxybenzaldehyde+acetophenone 1:1 | 80 |
| Terephthalic aldehyde+benzaldehyde 1:1 | 80 |

When the concentration of the polyester is increased, the solubility temperature also increases. If, for example, benzaldehyde is used as solvent, the solubility temperature is 100° C. for a solution of 1 percent strength, 110° C. for a solution of 5 percent strength, 130° C. for a solution of 20 percent strength, and 148° C. for a solution of 30 percent strength.

If desired, solutions of the polyester in the above solvents can be prepared which contain a maximum of about 40 percent of the polyester.

Any oxidation of the aldehydes to the corresponding acids by the access of air to the solution has no great influence on the solubility temperature. For example, the solubility temperature of a solution consisting of 1 gram of the polyester, 49.5 grams of benzaldehyde and 49.5 grams of benzoic acid is 110° C., and the solubility temperature of a solution consisting of 5 grams of the polyester, 9 grams of benzoic acid and 86 grams of benzaldehyde is 130° C.

I claim:

1. A composition of matter comprising a solution of polyethylene terephthalate in ortho-nitrobenzaldehyde.

2. A process which comprises heating up to about forty parts by weight of polyethylene terephthalate in contact with sixty parts by weight ortho-nitrobenzaldehyde to a temperature about 20 to 40° C. above the solubility temperature until dissolution of the polyethylene terephthalate in ortho-nitrobenzaldehyde is effected.

References Cited in the file of this patent

UNITED STATES PATENTS 2,762,788   Siggel et al. _____ Sept. 11, 1956

FOREIGN PATENTS 609,947   Great Britain _____ Oct. 8, 1948